(12) United States Patent
Miura et al.

(10) Patent No.: US 11,250,880 B2
(45) Date of Patent: Feb. 15, 2022

(54) MAGNETIC RECORDING MEDIUM HAVING CONTROLLED PROTRUSION CHARACTERISTICS

(71) Applicant: Sony Corporation, Tokyo (JP)

(72) Inventors: Toshiaki Miura, Miyagi (JP); Satoru Abe, Miyagi (JP); Yuuko Kamoshita, Miyagi (JP); Riku Yoshida, Miyagi (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 16/627,600

(22) PCT Filed: Apr. 13, 2018

(86) PCT No.: PCT/JP2018/015573
§ 371 (c)(1),
(2) Date: Dec. 30, 2019

(87) PCT Pub. No.: WO2019/003578
PCT Pub. Date: Jan. 3, 2019

(65) Prior Publication Data
US 2020/0126588 A1 Apr. 23, 2020

(30) Foreign Application Priority Data
Jun. 30, 2017 (JP) .............................. JP2017-128815

(51) Int. Cl.
*G11B 5/702* (2006.01)
*G11B 5/706* (2006.01)
(Continued)

(52) U.S. Cl.
CPC .............. *G11B 5/7022* (2013.01); *G11B 5/68* (2013.01); *G11B 5/702* (2013.01);
(Continued)

(58) Field of Classification Search
None
See application file for complete search history.

(56) References Cited

U.S. PATENT DOCUMENTS

| 7,300,715 B2 * | 11/2007 | Kurose | .................... | G11B 5/70 428/840.3 |
| 2003/0162056 A1 * | 8/2003 | Ono | .................... | G11B 5/73927 428/847.2 |

(Continued)

FOREIGN PATENT DOCUMENTS

| JP | 08-115517 | 5/1996 |
| JP | H08-115517 A | 5/1996 |

(Continued)

OTHER PUBLICATIONS

International Search Report and Written Opinion issued in connection with International Patent Application No. PCT/JP2018/015573, dated Jul. 3, 2018. (6 pages).

*Primary Examiner* — Kevin M Bernatz
(74) *Attorney, Agent, or Firm* — K&L Gates LLP (57) ABSTRACT

A magnetic recording medium includes: a substrate that is long in shape; and a magnetic layer containing magnetic powder and a binder. The glass transition point of the binder is not lower than 75° C. In a case where atomic force microscope observation images in a 10 μm×10 μm rectangular shape are acquired at five locations randomly selected from the surface on the side of the magnetic layer, any linear protrusion that is 3 nm to 20 nm in height, is 0.3 μm to 1.0 μm in width, and extends across two sides of the observation image does not exist in the observation images of four locations among the acquired observation images of the five locations.

15 Claims, 3 Drawing Sheets

(51) Int. Cl.
*G11B 5/68* (2006.01)
*G11B 5/733* (2006.01)
*G11B 5/73* (2006.01)

(52) U.S. Cl.
CPC ........ *G11B 5/70678* (2013.01); *G11B 5/7334* (2019.05); *G11B 5/7368* (2019.05)

(56) References Cited

U.S. PATENT DOCUMENTS

| | | | | |
|---|---|---|---|---|
| 2007/0020490 | A1* | 1/2007 | Harasawa | G11B 5/73 428/842.8 |
| 2010/0143752 | A1* | 6/2010 | Ishibashi | G11B 5/855 428/846 |
| 2013/0063836 | A1* | 3/2013 | Bui | G11B 5/00826 360/66 |
| 2013/0229895 | A1* | 9/2013 | Shiroishi | G11B 5/3146 369/13.14 |
| 2014/0212693 | A1* | 7/2014 | Hattori | G11B 5/733 428/832 |
| 2016/0093322 | A1* | 3/2016 | Kasada | G11B 5/708 428/840.2 |
| 2017/0092314 | A1* | 3/2017 | Mori | G11B 5/70 |

FOREIGN PATENT DOCUMENTS

| | | |
|---|---|---|
| JP | 11-073623 | 3/1999 |
| JP | H11-073623 A | 3/1999 |
| JP | 2000-025111 | 1/2000 |
| JP | 2000-025111 A | 1/2000 |
| JP | 2003-123222 | 4/2003 |
| JP | 2003-123222 A | 4/2003 |
| JP | 2005-149622 | 6/2005 |
| JP | 2005-149622 A | 6/2005 |
| JP | 2005-259287 | 9/2005 |
| JP | 2005-259287 A | 9/2005 |
| JP | 2010-238330 | 10/2010 |
| JP | 2010-238330 A | 10/2010 |
| JP | 2014-088365 | 5/2014 |
| JP | 2014-088365 A | 5/2014 |
| JP | 2014-154178 | 8/2014 |
| JP | 2014-154178 A | 8/2014 |
| JP | 2015-056189 | 3/2015 |
| JP | 2015-056189 A | 3/2015 |

* cited by examiner

MAGNETIC RECORDING MEDIUM HAVING CONTROLLED PROTRUSION CHARACTERISTICS

TECHNICAL FIELD

The present disclosure relates to a magnetic recording medium.

BACKGROUND ART

Binders having a high glass transition point Tg are used in magnetic recording media these days, from the viewpoint of improvement of durability and the like. For example, in Patent Document 1, a polyurethane resin having a glass transition point Tg of 50 to 115° C. is used as a binder for a magnetic recording medium. In Patent Document 2, a polyurethane resin having a glass transition point Tg of 70 to 160° C. is also used as a binder for a magnetic recording medium.

CITATION LIST

Patent Document

Patent Document 1: Japanese Patent Application Laid-Open No. H11-73623
Patent Document 2: Japanese Patent Application Laid-Open No. 2015-56189

SUMMARY OF THE INVENTION

Problems to be Solved by the Invention

However, in a case where a binder having a glass transition point Tg of 75° C. or higher is used, there is a possibility that the error rate of the magnetic recording medium will become higher.

An object of the present disclosure is to provide a magnetic recording medium capable of lowering the error rate.

Solutions to Problems

To solve the above problem, the present disclosure provides a magnetic recording medium that includes: a substrate that is long in shape; and a magnetic layer containing magnetic powder and a binder. The glass transition point of the binder is not lower than 75° C. In a case where atomic force microscope observation images in a 10 μm×10 μm square shape are acquired at five locations randomly selected from the surface on the side of the magnetic layer, any linear protrusion that is 3 nm to 20 nm in height, is 0.3 μm to 1.0 μm in width, and extends across two sides of the observation image does not exist in the observation images of four locations among the acquired observation images of the five locations.

Effects of the Invention

According to the present disclosure, a magnetic recording medium capable of lowering the error rate is obtained. Note that the effects of the present technology are not necessarily limited to the effects described herein, and may include any of the effects described in the present disclosure or any different effect from those described in the present disclosure.

MODE FOR CARRYING OUT THE INVENTION

Embodiments of the present disclosure will be described in the following order.
Overview
Configuration of a magnetic recording medium
Method for manufacturing a magnetic recording medium
Effects
Modifications

[Overview]

As a result of intensive studies, the present inventors have found that the cause of the error rate deteriorating in a case where the binder has a glass transition point Tg of 75° C. or higher lies in the aspects described below. That is, in a case where a binder having a glass transition point Tg of 75° C. or higher is used, it is necessary to increase the temperature of the heating roll during the calendering. However, when the temperature of the heating roll is set at a high temperature, cracks in the surface of the heating roll are transferred onto the medium surface (the surface of the magnetic layer), and linear protrusions are likely to be formed on the medium surface. If a large number of such cracks are formed on the medium surface, there is a possibility that the error rate will become higher.

Therefore, the present inventors have made extensive studies in view of the cause of an increase in the error rate. As a result, the inventors have found that the error rate can be lowered in a case where atomic force microscope observation images in a 10 μm×10 μm square shape are acquired at five locations randomly selected from the surface on the magnetic layer side, and any linear protrusion that is 3 nm to 20 nm in height, is 0.3 μm to 1.0 μm in width, and extends across two sides of the observation image does not exist in the observation images of four locations among the acquired observation images of the five locations.

[Configuration of a Magnetic Recording Medium]

Figure 1:
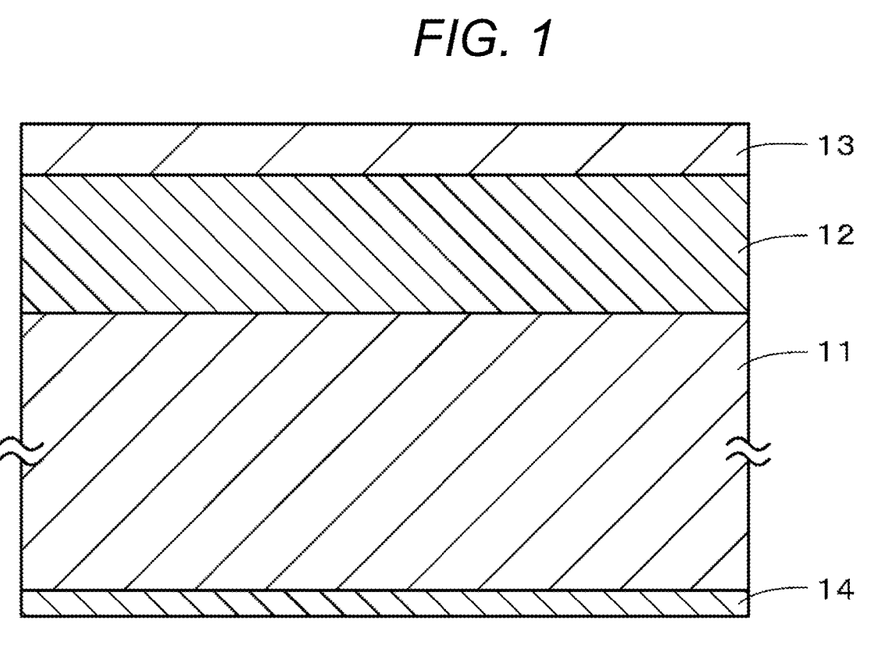
FIG. 1 is a cross-sectional view of the configuration of a magnetic recording medium according to an embodiment.

In the description below, an example configuration of a magnetic recording medium according to an embodiment will be described with reference to FIG. 1. The magnetic recording medium is a magnetic recording medium of a perpendicular magnetic recording system, and includes a long substrate 11, a nonmagnetic layer (an underlayer) 12 disposed on one principal surface of the substrate 11, and a magnetic layer (a recording layer) 13 disposed on the nonmagnetic layer 12. The magnetic recording medium may further include a protective layer (not shown), a lubricant layer (not shown), and the like disposed on the magnetic layer 13 as necessary. Further, a back coat layer 14 disposed on the other principal surface of the substrate 11 may also be included, if necessary.

The magnetic recording medium is long is shape, and is moved in a longitudinal direction during recording/reproduction. The shortest recording wavelength of the magnetic recording medium is preferably 75 nm or shorter. The linear recording density of the magnetic recording medium is preferably not lower than 520 kbpi, or more preferably, not lower than 560 kbpi. The track pitch of the magnetic recording medium is preferably not larger than 2.0 μm, or more preferably, not larger than 1.5 μm.

The magnetic recording medium is a medium on which data is recorded with a ring-shaped head, for example. The magnetic recording medium is such that data is reproduced with a reproducing head having a width that is preferably not greater than 1.0 μm, or more preferably, not greater than 0.5 μm. The reproducing head is a tunnel magnetoresistive (TMR) head, for example.

(Existence of Linear Protrusions)

In a case where atomic force microscope (AFM) observation images (hereinafter referred to as "AFM images") in a 10 μm×10 μm square shape are acquired at five locations randomly selected from the medium surface on the side of the magnetic layer 13, the medium surface has a configuration described below. That is, of the acquired AFM images of the five locations, the AFM images of the four locations do not have any linear protrusion that has a height of 3 nm to 20 nm and a width of 0.3 μm to 1.0 μm, and extends across two sides of the AFM image. Here, the two sides of the AFM image may be any two of the four sides of the square AFM image. That is, the two sides may be two adjacent sides or two opposite sides. As the medium surface on the side of the magnetic layer 13 has the above configuration, the error rate can be lowered. From the viewpoint of further lowering of the error rate, it is preferable that any linear protrusion does not exist in the AFM images of the five locations among the acquired AFM images of the five locations.

Figure 2:
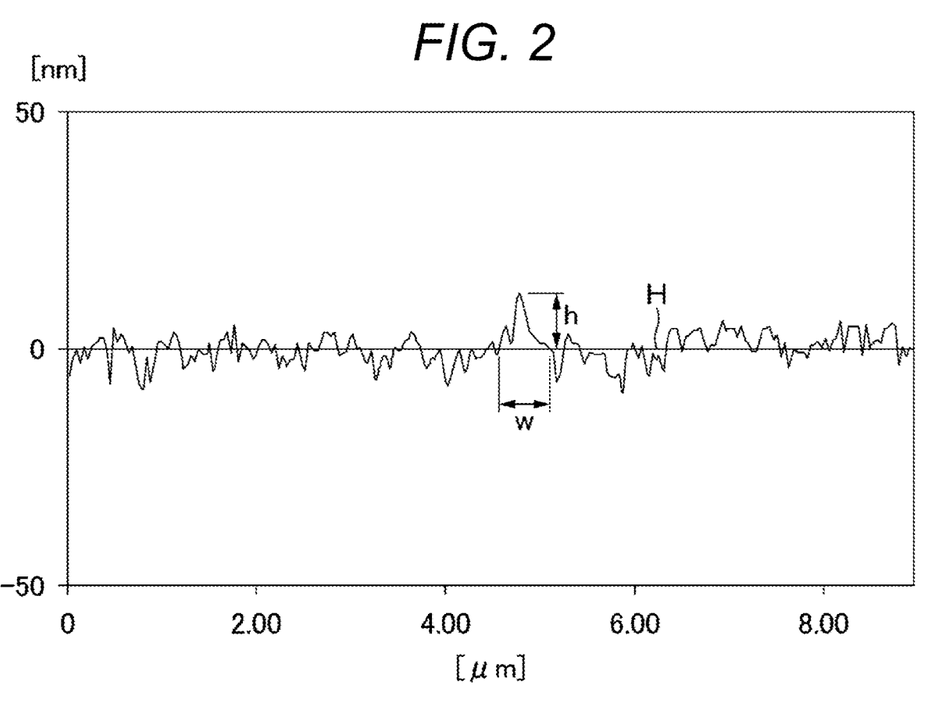
FIG. 2 is a schematic diagram showing an example of a cross-sectional profile of an atomic force microscope.

Here, the height and the width of each linear protrusion are measured as follows. First, in a case where a linear protrusion extending across two sides of an AFM image acquired in the above manner is observed, a cross-sectional profile in a direction substantially perpendicular to the extending direction of the protrusion is acquired (see FIG. 2). Next, an average height (center line) H is calculated from the acquired cross-sectional profile, in accordance with JIS B0601. Specifically, long-wavelength irregularities are removed from the cross-sectional profile, the cross-sectional profile is converted into a roughness curve, and a line that is drawn so that the sum of the areas of the peaks becomes equal to the sum of the areas of the valleys is defined as the average height (center line) H. The highest peak in the cross-sectional profile is then selected, and the height h of the highest peak is calculated on the basis of the average height H, and is defined as "the height of the linear protrusion". Further, the width w of the highest peak at the average height H is determined, and is defined as "the width of the linear protrusion". Note that Nano Scope IIIa D3100, manufactured by Digital Instruments, is used as the AFM, and a monocrystalline silicon cantilever is used as the cantilever.

(Arithmetic Average Roughness Ra)

The arithmetic average roughness Ra of the medium surface on the side of the magnetic layer 13 is preferably 1.5 nm or lower. Where the arithmetic average roughness Ra is 1.5 nm or lower, a medium surface having high smoothness can be obtained, and thus, the error rate can be further improved.

The arithmetic average roughness Ra is calculated as follows. First, the surface of the magnetic layer 13 is observed with an AFM, and a 40 μm×40 μm AFM image is obtained. Nano Scope IIIa D3100, manufactured by Digital Instruments, is used as the AFM, and a monocrystalline silicon cantilever is used as the cantilever. Next, the AFM image is divided into 256×256(=65536) measurement points, and the height Z(i) (i: measurement point number, i=1 through 65536) is measured at each measurement point. Simple averaging (arithmetic averaging) is then performed on the measured heights Z(i) at the respective measurement points, to obtain the average height (average plane) Zave(= (Z(1)+Z(2)+ . . . +Z(65536))/65536). The deviation Z"(i) (=Z(i)−Zave) from the average center line at each measurement point is then determined, so that the arithmetic average roughness Ra [nm](=(Z"(1)+Z"(2)+ . . . +Z"(65536))/65536) is calculated.

(Average Thickness of the Magnetic Recording Medium)

The average thickness of the magnetic recording medium is preferably not greater than 5.0 μm, or more preferably, not greater than 4.5 μm. To provide the medium surface on the side of the magnetic layer 13 with high smoothness by calendering, it is preferable to increase the nip pressure of the heating roll during the calendering, where the average thickness of the magnetic recording medium is smaller. However, if the nip pressure is made higher, cracks on the surface of the heating roll tend to be easily transferred on to the medium surface on the side of the magnetic layer 13. For this reason, in the magnetic recording medium having an average thickness of 5.0 μm or smaller, it is particularly effective to define the presence of linear protrusions as described above.

The average thickness of the magnetic recording medium is determined as follows. First, the thickness of the magnetic recording medium is measured with a step gauge at a total of five locations that are at intervals of 200 m in the longitudinal direction (the running direction) of the magnetic recording medium. Simple averaging (arithmetic averaging) is then performed on the measured thicknesses at the five locations of the magnetic recording medium, to determine the average thickness of the magnetic recording medium.

(Sum of the Average Thickness of the Magnetic Layer and the Average Thickness of the Nonmagnetic Layer)

The sum of the average thickness of the magnetic layer 13 and the average thickness of the nonmagnetic layer 12 is preferably not greater than 0.7 μm, or more preferably not greater than 0.5 μm. To provide the medium surface on the side of the magnetic layer 13 with high smoothness by calendering, it is preferable to increase the nip pressure of the heating roll during the calendering, where the sum of the average thickness of the magnetic layer 13 and the average thickness of the nonmagnetic layer 12 is smaller. However, if the nip pressure is made higher, cracks on the surface of the heating roll tend to be easily transferred on to the medium surface on the side of the magnetic layer 13. For this reason, in the magnetic recording medium in which the sum of the average thickness of the magnetic layer 13 and the average thickness of the nonmagnetic layer 12 is 0.7 μm or smaller, it is particularly effective to define the presence of linear protrusions as described above. The sum of the average thickness of the magnetic layer 13 and the average thickness of the nonmagnetic layer 12 is determined as follows. First, the magnetic recording medium to be measured is processed by the FIB method or the like, to produce a thin piece having principal surfaces parallel to the width direction of the magnetic recording medium. A cross-section of the thin piece is then observed with a TEM. The observation magnification is preferably at least 50,000 times so that the thicknesses of the magnetic layer 13 and the nonmagnetic layer 12 can be clearly observed. Cross-sectional TEM observation is performed at a total of five locations that are at intervals of 200 m in the longitudinal direction (the running direction) of the magnetic recording medium. The thicknesses of the magnetic layer 13 and the nonmagnetic layer 12 are then observed evenly at 50 points per field of view, and simple averaging (arithmetic averaging) is performed on the thicknesses of the magnetic layer 13 at all the five fields of view, to obtain the average thickness of the magnetic layer 13. Further, simple averaging (arithmetic averaging) is performed on the thicknesses of the nonmagnetic layer 12 at all the five fields of view, to obtain the average thickness of the nonmagnetic layer 12. The sum of the average thickness of the magnetic layer 13 and the average thickness of the nonmagnetic layer 12 is then determined.

(Substrate)

The substrate 11 serving as a support is a flexible, long nonmagnetic substrate. The nonmagnetic substrate is a film, and the thickness of the film is not smaller than 3 µm and not greater than 8 µm, for example. Examples of materials that can be used as the material of the substrate 11 include polyesters such as polyethylene terephthalate, polyolefins such as polyethylene and polypropylene, cellulose derivatives such as cellulose triacetate, cellulose diacetate, and cellulose butyrate, vinyl-based resins such as polyvinyl chloride and polyvinylidene chloride, plastics such as polycarbonate, polyimide, and polyamideimide, light metals such as an aluminum alloy and a titanium alloy, ceramics such as alumina glass, and the like.

(Magnetic Layer)

The magnetic layer 13 is a so-called perpendicular recording layer, and contains magnetic powder and a binder, for example. The magnetic layer 13 may further contain additives such as conductive particles, a lubricant, an abrasive, and a rust inhibitor, as necessary.

(Magnetic Powder)

The magnetic powder contains powder of nanoparticles containing ε iron oxide (hereinafter referred to as "ε iron oxide particles"). Even if the s iron oxide particles are fine particles, a high retention force can be obtained. The ε iron oxide particles have a spherical shape or a substantially spherical shape, or a cubic shape or a substantially cubic shape, for example. The ε iron oxide particles have a core-shell structure. Specifically, each ε iron oxide particles includes a core portion, and a shell portion that has a two-layer structure formed around the core portion. The shell portion having a two-layer structure includes a first shell portion disposed on the core portion, and a second shell portion disposed on the first shell portion.

The core portion contains ε iron oxide. The ε iron oxide contained in the core portion is preferably an iron oxide containing ε-$Fe_2O_3$s crystal as the main phase, or more preferably, is formed with single-phase ε-$Fe_2O_3$.

The first shell portion covers at least part of the periphery of the core portion. Specifically, the first shell portion may partially cover the periphery of the core portion, or may cover the entire periphery of the core portion. To ensure sufficient exchange coupling between the core portion and the first shell portion, and improve the magnetic characteristics, the first shell portion preferably covers the entire surface of the core portion.

The first shell portion is a so-called soft magnetic layer, and contains a soft magnetic material such as α-Fe, a Ni—Fe alloy, or a Fe—Si—Al alloy, for example. Here, α-Fe may be obtained by reducing the s iron oxide contained in the core portion.

The second shell portion is an oxide layer as an antioxidant layer. The second shell portion contains a iron oxide, aluminum oxide, or silicon oxide. The a iron oxide contains at least one of the following iron oxides: $Fe_3O_4$, $Fe_2O_3$, and FeO, for example. In a case where the first shell portion contains α-Fe (a soft magnetic material), the a iron oxide may be obtained by oxidizing the α-Fe contained in the first shell portion.

As the ε iron oxide particles each have the first shell portion as described above, the coercive force Hc of the ε iron oxide particles (core-shell particles) as a whole can be adjusted to a coercive force Hc suitable for recording, while the coercive force Hc of each single core portion is maintained at a great value to ensure thermal stability. Further, as the ε iron oxide particles each have the second shell portion as described above, the ε iron oxide particles are not exposed to the air before and during the process of manufacturing the magnetic recording medium, and the surfaces of the particles are not rusted. Accordingly, degradation of the characteristics of the ε iron oxide particles can be prevented. Thus, degradation of the characteristics of the magnetic recording medium can be prevented.

The average particle size (the average maximum particle size) of the magnetic powder is preferably not larger than 22 nm, more preferably, 8 nm to 22 nm, or even more preferably, 12 nm to 22 nm.

The average particle size of the magnetic powder is determined as follows. First, the magnetic recording medium to be measured is processed by the focused ion beam (FIB) method or the like, so that a thin piece is formed. A cross section of the thin piece is observed with a transmission electron microscope (TEM). From the captured TEM image, 500 ε iron oxide particles are then randomly selected, and the maximum particle size $d_{max}$ of each particle is measured, to obtain the particle size distribution of the maximum particle size $d_{max}$ of the magnetic powder. Here, the "maximum particle size $d_{max}$" means a so-called maximum ferret diameter, and specifically, is the longest distance between two parallel lines drawn from any angle so as to reach the contour of the ε iron oxide particle. After that, the arithmetic average of the obtained maximum particle sizes $d_{max}$ is determined, and is used as the average particle size (the average maximum particle size) of the magnetic powder.

(Binder)

From the viewpoint of improvement of the durability or the like of the magnetic recording medium, the binder contains a binder that has a glass transition point Tg of 75° C. or higher, preferably 80° C. or higher, more preferably 85° C. or higher, even more preferably 90° C. or higher, particularly preferably 95° C. or higher, or most preferably 100° C. or higher. The binder may further contain a binder having a glass transition point Tg of 75° C. or lower, as necessary.

For example, a polyester resin can be used as the binder having a glass transition point Tg of 75° C. or higher, but the binder is not limited to that. The polyester resin may be a modified copolymerized polyester resin such as a urethane-modified copolymerized polyester resin. Specific examples of the polyester resin include one manufactured by Tosoh Corporation under the trade name SSS-835 (Tg=80° C.), and those manufactured by Toyobo Co., Ltd. under the trade names UR-1400 (Tg=83° C.), UR-1700 (Tg=92° C.), and UR-4800 (Tg=106° C.)

Further, a polyester resin or a vinyl chloride resin can be used as the binder having a glass transition point Tg of 75° C. or lower, for example, but the binder is not limited to these resins. The polyester resin may be a modified copolymerized polyester resin such as a urethane-modified copolymerized polyester resin. The vinyl chloride resin may be a vinyl chloride copolymer such as a vinyl chloride-vinyl acetate copolymer, a vinyl chloride-vinyl acetate-vinyl alcohol copolymer, or a vinyl chloride-vinylidene chloride copolymer.

Specific examples of the polyester resin include one manufactured by Tosoh Corporation under the trade name N-2304 (Tg=−23° C.), and one manufactured by Toyobo Co., Ltd. under the trade name UR-8200 (Tg=73° C.) Specific examples of the vinyl chloride resin include those manufactured by Zeon Corporation under the trade names MR110, MR104, MR112, and MR113 (Tg=70° C.)

The glass transition point Tg of the binder is determined as follows. First, a measurement sample is cut out from the magnetic recording medium, and dynamic viscoelasticity is measured under the conditions shown below, to obtain a viscoelastic spectrum. The maximum temperature of Tan δ of the obtained viscoelastic spectrum is then determined, and is set as the glass transition point Tg.

Measuring instrument: a viscoelasticity measuring device (trade name: RSA-II), manufactured by Rheometrics, Inc.
Sample size: 22.0 mm×4.0 mm
Measurement frequency: 0.1 Hz to 10 Hz
Measurement temperature: 25° C. to 210° C.
Temperature increase rate: 5° C./min
Measurement interval: 10 sec
Displacement: 0.1%
(Average Thickness of the Magnetic Layer)

The average thickness of the magnetic layer 13 is preferably 30 nm to 120 nm, more preferably 40 nm to 100 nm, even more preferably 40 nm to 80 nm, or most preferably 40 nm to 70 nm.

The average thickness of the magnetic layer 13 is calculated by a measurement method similar to that described above in "Sum of the Average Thickness of the Magnetic Layer and the Average Thickness of the Nonmagnetic Layer".

(Nonmagnetic Layer)

The nonmagnetic layer 12 is an underlayer containing nonmagnetic powder and a binder, for example. The nonmagnetic layer 12 may further contain at least one additive selected from conductive particles, a lubricant, a hardening agent, a rust inhibitor, and the like, as necessary.

(Nonmagnetic Powder)

The nonmagnetic powder contains powder of nonmagnetic particles. The nonmagnetic particles may contain an inorganic substance or an organic substance. Examples of the inorganic substance include metals, metal oxides, metal carbonates, metal sulfates, metal nitrides, metal carbides, and metal sulfides.

Further, the nonmagnetic particles may contain carbon such as carbon black. In this case, the area ratio of the carbon in the nonmagnetic layer 12 is preferably 80% or higher. Where the area ratio of the carbon in the nonmagnetic layer 12 is 80% or higher, the strength of the coating film increases, and the running durability in a high-humidity environment becomes higher.

The area ratio of the carbon in the nonmagnetic layer 12 is determined as follows. First, from TEM cross-sectional photographs of five locations on the nonmagnetic layer 12, the cross-sectional area of the carbon and the cross-sectional area of the entire nonmagnetic layer 12 are determined. From these cross-sectional areas, the respective area ratios of the above five locations (the cross-sectional area of the carbon/the cross-sectional area of the entire nonmagnetic layer 12) are then calculated, and the arithmetic average value of the obtained area ratios is set as the area ratio of the carbon in the nonmagnetic layer 12.

Examples of the shape of each nonmagnetic particle include various shapes such as an acicular shape, a spherical shape, a cubic shape, and a plate-like shape, but are not limited to these shapes. Note that nonmagnetic particles in two or more kinds of shapes may be used in combination. In a case where the shape of each nonmagnetic particle is acicular, the average long axis length of the nonmagnetic powder is preferably 70 nm or greater. Where the average long axis length is 70 nm or greater, it is difficult to smooth the medium surface on the side of the magnetic layer 13 by calendering. Therefore, it is preferable to increase the nip pressure of the heating roll during the calendering. In this case, however, cracks on the surface of the heating roll tend to be easily transferred on to the medium surface on the side of the magnetic layer 13. Therefore, in a case where the nonmagnetic powder having an average long axis length of 70 nm or greater is contained in the nonmagnetic layer 12, it is particularly effective to define the presence of linear protrusions as described above.

The average long axis length of the nonmagnetic powder is determined as follows. First, the magnetic recording medium to be measured is processed by the FIB method or the like, to produce a thin piece, and a cross-section of the thin piece is observed with a TEM. From the captured TEM image, 500 nonmagnetic particles are then randomly selected, and the long axis length of each particle is measured. The arithmetic average of the long axis length of the nonmagnetic particles is then determined, and is set as the average long axis length of the nonmagnetic powder.

(Binder)

The binder is similar to the binder contained in the magnetic layer 13 described above.

(Average Thickness of the Nonmagnetic Layer)

The average thickness of the nonmagnetic layer 12 is preferably 0.4 μm to 2.0 μm, or more preferably, 0.4 μm to 1.4 μm. The average thickness of the nonmagnetic layer 12 is calculated by a measurement method similar to that described above in "Sum of the Average Thickness of the Magnetic Layer and the Average Thickness of the Nonmagnetic Layer".

[Configuration of the Heating Roll]

In the description below, an example configuration of the heating roll to be used in the calendering will be explained. The heating roll includes: a roll body including steel; an amorphous nickel alloy layer coating the surface of the roll body; and a hard chromium plating layer coating the nickel alloy layer.

The amorphous nickel alloy preferably contains one of the following alloys: a nickel-phosphorus alloy, a nickel-tungsten alloy, and a nickel-tungsten-phosphorus alloy.

The thickness of the hard chromium plating layer is preferably not smaller than 0.1 μm and not greater than 2.0 μm. The surface roughness Ra of the hard chromium plating layer is preferably not higher than 5 nm, or more preferably, not higher than 3 nm.

[Method of Preparing the Heating Roll]

The heating roll having the above configuration is prepared as follows. First, an amorphous nickel alloy layer is formed on the surface of the roll body including steel. The nickel alloy layer is then polished or cut, and a chromium plating layer is formed on the polished or cut amorphous nickel alloy layer. After that, the chromium plating layer is polished, so that the hard chromium plating layer is formed at the outermost portion. For polishing the chromium plating layer, it is preferable to use a polishing pad including felt or suede cloth, and loose grains that have an average particle size of 10 μm or smaller and contains an oxide.

[Method of Manufacturing the Magnetic Recording Medium]

In the description below, an example of a method of manufacturing the magnetic recording medium having the above configuration will be explained.

(Mixing Process)

First, nonmagnetic powder, a binder, and the like are kneaded and dispersed in a solvent, to prepare a coating material for forming a nonmagnetic layer. Next, magnetic powder, a binder, and the like are kneaded and dispersed in a solvent, to prepare a coating material for forming a magnetic layer. In the preparation of the coating material for forming the magnetic layer and the coating material for forming the nonmagnetic layer, any of the solvents, any of the dispersion devices, and any of the kneading devices mentioned below can be used, for example.

Examples of the solvents that can be used in the preparation of the above coating materials include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, halogenated hydrocarbon solvents such as methylene chloride, ethylene chloride, carbon tetrachloride, chloroform, and chlorobenzene, and the like. These solvents may be used individually, or may be mixed as appropriate.

The kneading device that can be used in the preparation of the above coating materials may be a continuous biaxial kneader, a continuous biaxial kneader capable of diluting in multiple stages, a kneader, a pressure kneader, or a roll kneader, for example. However, the kneading device is not limited to any particular one of these devices. Further, the dispersing device that can be used in the preparation of the above coating materials may be a roll mill, a ball mill, a horizontal sand mill, a vertical sand mill, a spike mill, a pin mill, a tower mill, a pearl mill (for example, a "DCP mill" manufactured by Maschinenfabrik Gustav Eirich GmbH & Co., KG), a homogenizer, or an ultrasonic disperser, for example. However, the dispersing device is not limited to any particular one of these devices.

(Coating Process)

The coating material for forming the nonmagnetic layer is then applied onto one of the principal surfaces of the long substrate 11 and is dried, so that the nonmagnetic layer 12 is formed. The coating material for forming the magnetic layer is then applied onto the nonmagnetic layer 12 and is dried, so that the magnetic layer 13 is formed on the nonmagnetic layer 12. As a result, a wide magnetic recording medium having a long shape is obtained. Note that, during the drying, the magnetic powder is magnetically oriented in the thickness direction of the substrate 11 by a solenoid coil, for example. After the formation of the magnetic layer 13, a protective layer and a lubricant layer may be formed on the magnetic layer 13, or the back coat layer 14 may be formed on the other principal surface of the substrate 11, as necessary.

(Calendering Process)

Next, calendering is performed on the obtained magnetic recording medium. Specifically, the obtained magnetic recording medium is nipped between a heating roll and a cooling roll, and the surface of the magnetic layer 13 is smoothed. Note that a heating roll having the above described configuration is used as the heating roll. At this stage, the surface temperature of the heating roll is adjusted to a temperature that is be equal to or higher than the melting point of the binder, such as a temperature of 100° C. to 150° C., for example. Further, the nip pressure generated by the heating roll and the cooling roll is adjusted so that the pressure to be applied to the surface of the magnetic layer 13 by the heating roll becomes 100 N/mm or higher, for example.

(Cutting Process)

Lastly, the magnetic recording medium obtained as described above is cut in the longitudinal direction of the medium so as to have a predetermined width. Thus, the intended magnetic recording medium is obtained.

[Effect]

The magnetic recording medium according to an embodiment includes the long substrate 11 and the magnetic layer 13 containing magnetic powder and a binder. The glass transition point of the binder is 75° C. or higher. Further, in a case where 10 μm×10 μm square AFM images are acquired at five locations randomly selected from the surface on the side of the magnetic layer 13, any linear protrusion that is 3 nm to 20 nm in height, 0.3 μm to 1.0 μm in width, and extends across two sides of the corresponding AFM image does not exist in the AFM images of four locations among the acquired AFM images of the five locations. Thus, the error rate can be lowered.

[Modifications]

(First Modification)

The magnetic powder may include powder of particles containing barium ferrite, instead of the powder of ε iron oxide particles.

(Second Modification)

The magnetic recording medium does not necessarily include the nonmagnetic layer 12.

(Third Modification)

In the embodiment described above, a case where the ε iron oxide particles each include a shell portion having a two-layer structure has been described. However, each ε iron oxide particle may include a shell portion having a single-layer structure. In this case, the shell portion has a configuration similar to that of the first shell portion. However, from the viewpoint of preventing degradation of the characteristics of the ε iron oxide particles, each ε iron oxide particle preferably includes a shell portion having a two-layer structure as in the above described embodiment.

(Fourth Modification)

In the above described embodiment, a case where the ε iron oxide particles each have a core-shell structure has been described. However, each ε iron oxide particle may contain an additive, instead of a core-shell structure, or may have a core-shell structure and contain an additive. In this case, part of the Fe of the ε iron oxide particles is replaced with the additive. As the ε iron oxide particles contain the additive, the coercive force Hc of the ε iron oxide particles as a whole can also be adjusted to a coercive force Hc suitable for recording, and thus, the readiness for recording increases. The additive is a metal element other than iron, preferably a trivalent metal element, or more preferably one or more elements selected from the group including aluminum (Al), gallium (Ga), and indium (In).

Specifically, the ε iron oxide containing the additive is ε-$Fe_{2-x}M_xO_3$ crystal (where M is a metal element other than iron, preferably a trivalent metal element, or more preferably one or more elements selected from the group including Al, Ga, and In; x is 0<x<1, for example).

(Fifth Modification)

Figure 3:
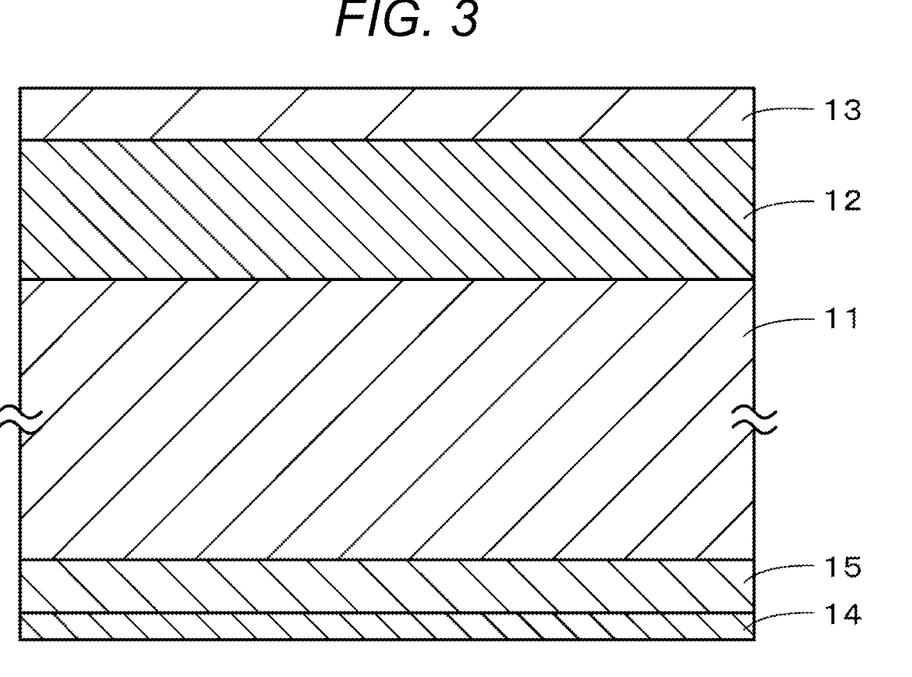
FIG. 3 is a cross-sectional view of the configuration of a magnetic recording medium according to a modification.

As shown in FIG. 3, the magnetic recording medium may further include a reinforcing layer 15 disposed on the other principal surface (hereinafter referred to as the "back surface") on the side of the back coat layer 14, of the two principal surfaces of the substrate 11. In this case, the back coat layer 14 is disposed on the reinforcing layer 15.

Note that the reinforcing layer 15 may be provided on either of the two principal surfaces of the substrate 11, and the reinforcing layer 15 may be disposed on the principal surface on the side of the magnetic layer 13 (this principal surface will be hereinafter referred to as the "front surface"), of the two principal surfaces of the substrate 11. In this case, the nonmagnetic layer 12 is disposed on the reinforcing layer 15.

The reinforcing layer 15 is designed for increasing the mechanical strength of the magnetic recording medium, and obtaining excellent dimensional stability. The reinforcing layer 15 contains at least a metal and/or a metal compound, for example. Here, metals are defined to include semimetals. The metal is aluminum and/or copper, and is preferably copper, for example. This is because copper is inexpensive and has a relatively low vapor pressure, and accordingly, the reinforcing layer 15 can be formed with copper at low cost. The metal compound is a metal oxide, for example. The metal oxide is at least one of the following oxides: an aluminum oxide, a copper oxide, and a silicon oxide, for example. The metal oxide is preferably a copper oxide. This is because the reinforcing layer 15 can be formed with a copper oxide by a vapor deposition technique or the like at low cost. For example, the reinforcing layer 15 may be a vapor-deposited film formed by a vacuum oblique vapor deposition technique, or may be a sputtered film formed by a sputtering technique.

The reinforcing layer 15 preferably has a laminated structure that is formed with two or more layers. Increasing the thickness of the reinforcing layer 15 can further reduce expansion and contraction of the substrate 11 due to external forces. However, in a case where the reinforcing layer 15 is formed by a vacuum thin film manufacturing technique such as a vapor deposition technique or sputtering, there is a possibility that voids are easily formed in the reinforcing layer 15 as the thickness of the reinforcing layer 15 is increased as described above. As the reinforcing layer 15 has a laminated structure formed with two or more layers as described above, the voids to be formed in the reinforcing layer 15 when the reinforcing layer 15 is formed by a vacuum thin film manufacturing technique can be reduced, and the denseness of the reinforcing layer 15 can be increased. Accordingly, the moisture vapor transmission rate of the reinforcing layer 15 can be lowered. Thus, expansion of the substrate 11 can be further reduced, and the dimensional stability of the magnetic recording medium can be further increased. In a case where the reinforcing layer 15 has a laminated structure that is formed with two or more layers, the materials of the respective layers may be the same, or may be different.

The average thickness of the reinforcing layer 15 is preferably not smaller than 150 nm and not greater than 500 nm. Where the average thickness of the reinforcing layer 15 is not smaller than 150 nm, a preferred function as the reinforcing layer 15 (that is, excellent dimensional stability of the magnetic recording medium) can be obtained. On the other hand, even though the average thickness of the reinforcing layer 15 is not greater than 500 nm, a sufficient function as the reinforcing layer 15 can be obtained. Note that the above average thickness of the reinforcing layer 15 is determined in a manner similar to the above described method for calculating the average thickness of the magnetic layer 13.

In a case where the magnetic recording medium includes the reinforcing layer 15, the Young's modulus in the longitudinal direction of the long magnetic recording medium is preferably not lower than 7 GPa and not higher than 14 GPa. Where the Young's modulus is not lower than 7 GPa, excellent magnetic head contact can be achieved, and edge damage can be reduced. Where the Young's modulus is not higher than 14 GPa, on the other hand, excellent magnetic head contact can be achieved.

Further, the humidity expansion coefficient of the magnetic recording medium is preferably not lower than 0.5 ppm/% RH and not higher than 4 ppm/% RH. Where the humidity expansion coefficient is in the above range, the dimensional stability of the magnetic recording medium can be further increased.

(Sixth Modification)

Figure 4:
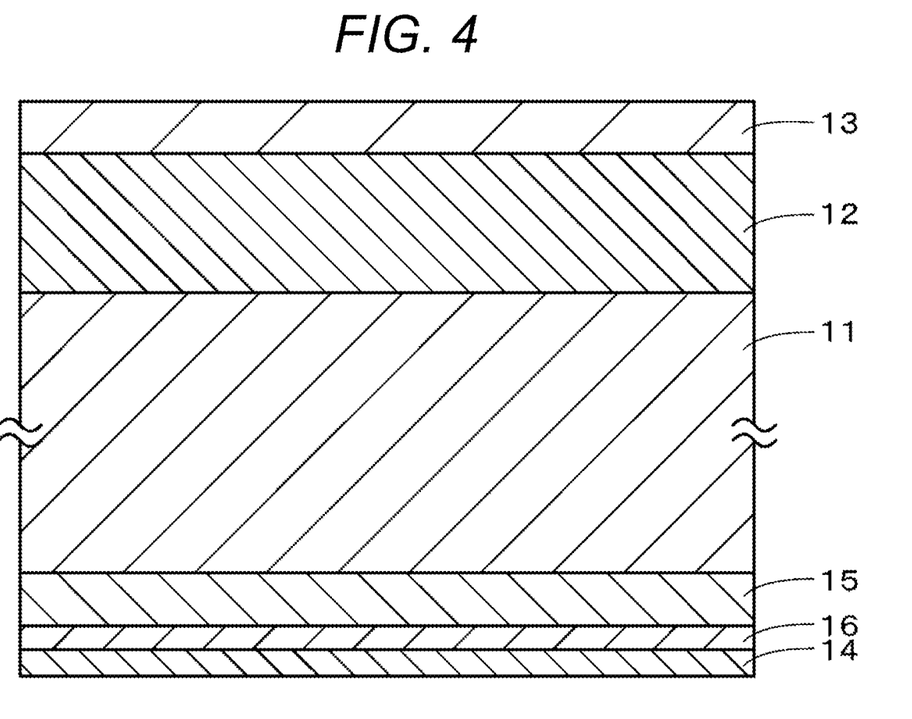
FIG. 4 is a cross-sectional view of the configuration of a magnetic recording medium according to a modification.

The magnetic recording medium may further include an anti-cupping layer 16 disposed on the reinforcing layer 15, as shown in FIG. 4. Note that, in a case where the nonmagnetic layer 12 and the anti-cupping layer 16 are disposed on the back surface side of the substrate 11, the back coat layer 14 is disposed on the anti-cupping layer 16. On the other hand, in a case where the nonmagnetic layer 12 and the anti-cupping layer 16 are disposed on the front surface side of the substrate 11, the nonmagnetic layer 12 is disposed on the anti-cupping layer 16.

The anti-cupping layer 16 is for reducing cupping that is caused due to the formation of the reinforcing layer 15 on the substrate 11. Here, "cupping" means a curve that is formed in the width direction of the long substrate 11. The reinforcing layer 15 is subjected to a tensile stress as the internal stress, which is such a stress that the principal surface having the reinforcing layer 15 disposed thereon between the two principal surfaces of the substrate 11 is curved to form a concave shape in the width direction. On the other hand, the anti-cupping layer 16 is subjected to a compressive stress as the internal stress, which is such a stress that the principal surface having the anti-cupping layer 16 disposed thereon between the two principal surfaces of the substrate 11 is curved to form a convex shape in the width direction. Accordingly, the internal stress of the reinforcing layer 15 and the internal stress of the anti-cupping layer 16 cancel each other out, to prevent the occurrence of cupping in the magnetic recording medium. Thus, it is possible to provide a magnetic recording medium that can maintain an excellent contact state between a magnetic head and the magnetic recording medium, has a high dimensional stability in the track width direction, and excels in off-track characteristics.

The anti-cupping layer 16 is a carbon thin film, for example. The carbon thin film is preferably a hard carbon thin film containing diamond-like carbon (hereinafter referred to as "DLC"). The anti-cupping layer 16 may be a CVD film formed by a chemical vapor deposition (CVD) technique, or may be a sputtered film formed by a sputtering technique, for example.

The anti-cupping layer 16 preferably has a laminated structure that is formed with two or more layers. This is because the dimensional stability of the magnetic recording medium can be further increased. Note that the principles are similar to those in the case where the reinforcing layer 15 has a laminated structure that is formed with two or more layers. In a case where the anti-cupping layer 16 has a laminated structure that is formed with two or more layers, the materials of the respective layers may be the same, or may be different.

The average thickness of the anti-cupping layer 16 is preferably not smaller than 10 nm and not greater than 200 nm. Where the average thickness of the anti-cupping layer 16 is smaller than 10 nm, there is a possibility that the compressive stress of the anti-cupping layer 16 will become too low. Where the average thickness of the anti-cupping layer 16 is greater than 200 nm, on the other hand, there is a possibility that the compressive stress of the anti-cupping layer 16 will become too high. Note that the average thickness of the anti-cupping layer 16 is determined in a manner similar to the above described method for calculating the average thickness of the magnetic layer 13.

(Seventh Modification)

Figure 5:
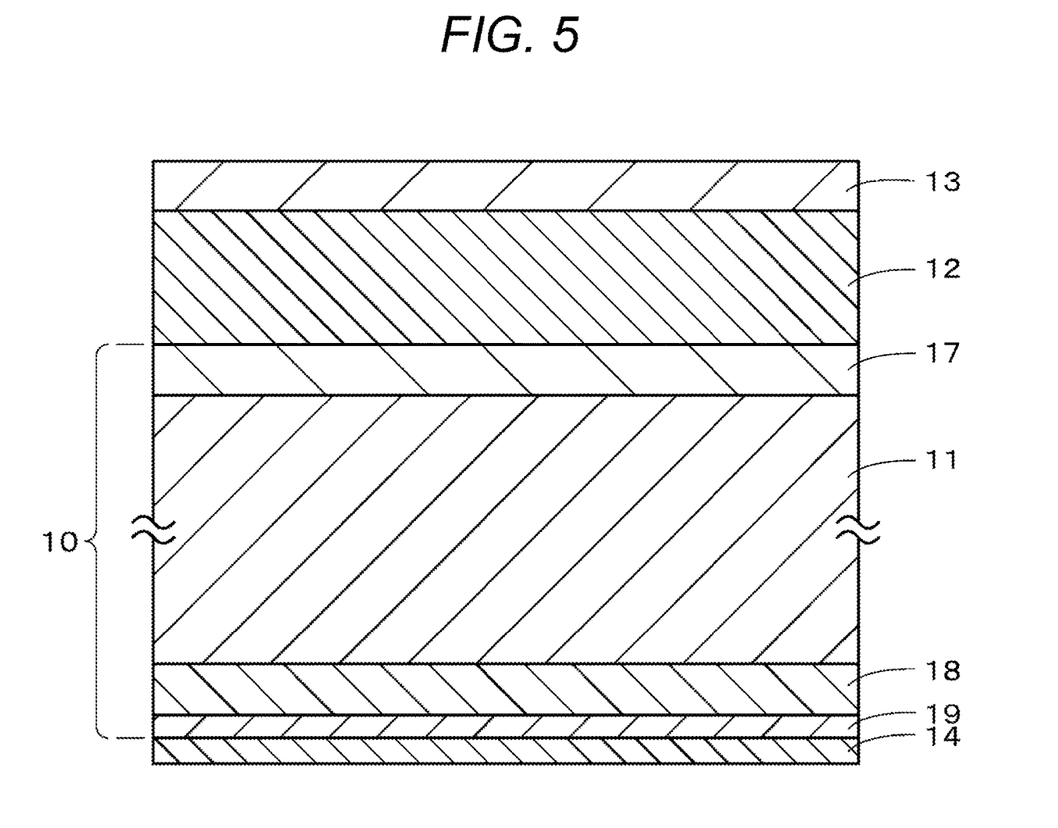
FIG. 5 is a cross-sectional view of the configuration of a magnetic recording medium according to a modification.

As shown in FIG. 5, the magnetic recording medium may further include a first reinforcing layer 17 disposed on the front surface of the substrate 11, a second reinforcing layer 18 disposed on the back surface of the substrate 11, and an anti-adhesion layer 19 disposed on the second reinforcing layer 18. In this case, the back coat layer 14 is disposed on the anti-adhesion layer 19. The substrate 11, the first reinforcing layer 17, the second reinforcing layer 18, and the anti-adhesion layer 19 constitute a laminate 10.

Note that the anti-adhesion layer 19 is only required to be disposed on one of the first and second reinforcing layers 17 and 18, and the anti-adhesion layer 19 may be disposed on the first reinforcing layer 17. In this case, the nonmagnetic layer 12 is disposed on the anti-adhesion layer 19. In a case where the anti-adhesion layer 19 is a carbon thin film in this case, it is preferable to improve the wettability of the surface of the anti-adhesion layer 19 by a surface modification treatment. This is because the coatability of the coating material for forming the nonmagnetic layer with respect to the carbon thin film can be increased.

The first and second reinforcing layers 17 and 18 are designed for increasing the mechanical strength of the magnetic recording medium, and obtaining excellent dimensional stability. Examples of the materials of the first and second reinforcing layers 17 and 18 may be similar to the example materials for the reinforcing layer 15 of the fifth modification. Note that the first and second reinforcing layers 17 and 18 may include the same material, or may include different materials. Each of the first and second reinforcing layers 17 and 18 preferably has a laminated structure that is formed with two or more layers. This is because the dimensional stability of the magnetic recording medium can be further increased. Note that the principles are similar to those in the case where the reinforcing layer 15 has a laminated structure that is formed with two or more layers in the fifth modification.

The average thicknesses of the first and second reinforcing layers 17 and 18 are preferably not smaller than 75 nm and not greater than 300 nm. Where the average thicknesses of the first and second reinforcing layers 17 and 18 are not smaller than 75 nm, a preferred function as the first and second reinforcing layers 17 and 18 (that is, excellent dimensional stability of the magnetic recording medium) can be obtained. Where the average thicknesses of the first and second reinforcing layers 17 and 18 are greater than 300 nm, on the other hand, there is a possibility that the thickness of the magnetic recording medium becomes greater. Further, even though the average thicknesses of the first and second reinforcing layers 17 and 18 are not greater than 300 nm, a sufficient function as the first and second reinforcing layers 17 and 18 can be obtained. Note that the average thicknesses of the first and second reinforcing layers 17 and 18 are determined in a manner similar to the above described method for calculating the average thickness of the magnetic layer 13.

The first and second reinforcing layers 17 and 18 are subjected to a tensile stress as the internal stress. Specifically, the first reinforcing layer 17 is subjected to such a stress that the front surface of the substrate 11 is curved to form a concave shape in the width direction, and the second reinforcing layer 18 is subjected to such a stress that the back surface of the substrate 11 is curved to form a concave shape in the width direction. Accordingly, the internal stresses of the first and second reinforcing layers 17 and 18 cancel each other out, to prevent the occurrence of cupping in the magnetic recording medium. Here, "cupping" means a curve that is formed in the width direction of the long substrate 11.

The average thicknesses of the first and second reinforcing layers 17 and 18 may be the same or may be different, but are preferably the same or substantially the same. This is because the internal stresses (tensile stresses) of the first and second reinforcing layers 17 and 18 disposed on the two surfaces of the substrate 11 will become the same or substantially the same, and the occurrence of cupping can be further reduced. Here, the average thicknesses of the first and second reinforcing layers 17 and 18 being substantially the same means that the difference in the average thickness between the first and second reinforcing layers 17 and 18 is smaller than 5 nm.

The anti-adhesion layer 19 is for preventing the first and second reinforcing layers 17 and 18 from having metallic adhesion and sticking, in a case where the laminate 10 is wound up into a roll. The anti-adhesion layer 19 may have conductivity, or may have insulating properties. The anti-adhesion layer 19 may be subjected to a compressive stress as the internal stress (which is such a stress that the surface having the anti-adhesion layer 19 disposed thereon of the two principal surfaces of the substrate 11 is curved to form a convex shape in the width direction), or may be subjected to a tensile stress as the internal stress (which is such a stress that the surface having the anti-adhesion layer 19 disposed thereon of the two principal surfaces of the substrate 11 is curved to form a concave shape in the width direction).

In a case where the tensile stresses (the internal stresses) of the first and second reinforcing layers 17 and 18 are different, the anti-adhesion layer 19 on which a compressive stress acts as the internal stress may be disposed on the reinforcing layer having the higher tensile stress between the first and second reinforcing layers 17 and 18. This is because the tensile stress that is not canceled out due to the difference in tensile stress between the first and second reinforcing layers 17 and 18 can be canceled out by the compressive stress of the anti-adhesion layer 19. Alternatively, the anti-adhesion layer 19 on which a tensile stress acts as the internal stress may be disposed on the reinforcing layer having the lower tensile stress between the first and second reinforcing layers 17 and 18. This is because the compressive stress caused by the difference in tensile stress between the first and second reinforcing layers 17 and 18 can be canceled out by the tensile stress of the anti-adhesion layer 19.

The average thickness of the anti-adhesion layer 19 is preferably 1 nm to 100 nm, more preferably 2 nm to 25 nm, or even more preferably 2 nm to 20 nm. Where the average thickness of the anti-adhesion layer 19 is not smaller than 1 nm, it is possible to prevent the average thickness of the anti-adhesion layer 19 from becoming too small, and prevent the function as the anti-adhesion layer 19 from deteriorating. Where the average thickness of the anti-adhesion layer 19 is not greater than 100 nm, on the other hand, it is possible to prevent the average thickness of the anti-adhesion layer 19 from becoming too great, or prevent the internal stress of the anti-adhesion layer 19 from becoming too high. The average thickness of the anti-adhesion layer 19 is determined in a manner similar to the above described method for calculating the average thickness of the magnetic layer 13.

In a case where the average thickness D2 of the second reinforcing layer 18 is not smaller than 75 nm and not greater than 300 nm, the ratio (D4/D2) of the average thickness D4 of the anti-adhesion layer 19 to the average thickness D2 of the second reinforcing layer 18 is preferably not lower than 0.005 and not higher than 0.35. Where the ratio (D4/D2) is not lower than 0.005, it is possible to prevent the average thickness D4 of the anti-adhesion layer 19 from becoming too small relative to the average thickness D2 of the second reinforcing layer 18, and prevent the function as the anti-adhesion layer 19 from deteriorating. Where the ratio (D4/D2) is not higher than 0.35, on the other hand, it is possible to prevent the average thickness D4 of the anti-adhesion layer 19 from becoming too great relative to the average thickness D2 of the second reinforcing layer 18, or prevent the compressive stress of the anti-adhesion layer 19 from becoming too high relative to the tensile stress of the second reinforcing layer 18. Thus, the occurrence of cupping can be further reduced.

The anti-adhesion layer 19 contains at least carbon and/or a metal oxide, for example. The anti-adhesion layer 19 is preferably a carbon thin film containing carbon as its principal component, or a metal oxide film containing a metal oxide as its principal component. The carbon is preferably diamond-like carbon (hereinafter referred to as "DLC"). The metal oxide preferably contains at least one oxide among an aluminum oxide, a copper oxide, and a cobalt oxide. The anti-adhesion layer 19 may be a CVD film formed by a chemical vapor deposition (CVD) technique, or may be a sputtered film formed by a sputtering technique, for example.

The anti-adhesion layer 19 preferably has a laminated structure that is formed with two or more layers. This is because the dimensional stability of the magnetic recording medium can be further increased. Note that the principles are similar to those in the case where the reinforcing layer 15 has a laminated structure that is formed with two or more layers in the fifth modification. In a case where the anti-adhesion layer 19 has a laminated structure that is formed with two or more layers, the materials of the respective layers may be the same, or may be different.

In the magnetic recording medium having the above configuration, the internal stresses (the tensile stresses) of the first and second reinforcing layers 17 and 18 cancel each other out, to prevent the occurrence of cupping in the magnetic recording medium. Thus, it is possible to provide a magnetic recording medium that can maintain an excellent contact state between a magnetic head and the magnetic recording medium, has a high dimensional stability in the track width direction, and excels in off-track characteristics. Further, in the process of manufacturing the magnetic recording medium, when the laminate 10 is wound up into a roll, the anti-adhesion layer 19 is interposed between the first and second reinforcing layers 17 and 18. Thus, metallic adhesion between the first and second reinforcing layers 17 and 18 can be prevented.

EXAMPLES

In the description below, the present disclosure will be specifically explained by way of examples. However, the present disclosure is not limited only to these examples.

Example 1

(Heating Roll Preparation Process)

First, the surface of the body of the roll was subjected to grinder polishing, and was then buffed. Next, a nickel-phosphorus alloy layer was formed by a plating technique, to coat the polished surface. The surface of the nickel-phosphorus alloy layer coating the body of the roll was then polished with a grinding stone using a cylindrical precision mirror finisher.

Next, the surface of the nickel-phosphorus alloy layer coating the body of the roll was further polished with felt and loose grains. After the roll was immersed in a sulfuric acid solution, a chromium plating bath containing chromic anhydride and sulfuric acid was used, to coat the nickel-phosphorus alloy layer with a chromium plating. The thickness of the chromium plating layer was 1 μm, and the surface roughness Ra after the chromium plating was 3 nm.

The roll was attached again to the same cylindrical precision mirror finisher, and the chromium-plated surface of the roll was polished with a polishing head having suede cloth as the polishing pad, while a polishing liquid containing loose grains (alumina), aluminum nitrate, and a dispersion aid was being dripped. In this manner, the intended heating roll was obtained.

(Magnetic Powder Preparation Process)

The magnetic powder was prepared as follows. First, powder of ε iron oxide nanoparticles (ε-$Fe_2O_3$ crystal particles) each having a substantially spherical shape was prepared. The powder of ε iron oxide nanoparticles was then subjected to a reduction treatment and a gradual oxidation treatment as described below, to obtain powder of core-shell ε iron oxide nanoparticles each including a shell portion having a two-layer structure.

(Reduction Treatment)

First, the powder of ε iron oxide nanoparticles was placed on a quartz boat, and was put into a tubular furnace. After the loading, the inside of the tubular furnace was replaced with a $N_2$ atmosphere, and was then heated to a predetermined temperature. After the temperature rise, a heating treatment was performed at 350° C. while 100% $H_2$ was made to flow at a flow rate of 100 ml/min. As a result, the surfaces of the ε iron oxide nanoparticles were reduced and transformed into α-Fe, and an α-Fe layer was formed on the surface of each ε iron oxide nanoparticle. After that, the inside of the tubular furnace was again replaced with an $N_2$ atmosphere, and was cooled to room temperature. As a result, powder of core-shell ε iron oxide nanoparticles each having an α-Fe layer on the surface was obtained.

(Gradual Oxidation Treatment)

After that, heating to a predetermined temperature was performed, and a heating treatment was performed at 300° C. for 5 minutes while a $N_2$ gas containing trace oxygen was made to flow at a flow rate of 100 ml/min. As a result, the surface of each α-Fe layer was oxidized, and an ε-$Fe_2O_3$ layer was formed on the surface of each α-Fe layer. After that, the inside of the tubular furnace was again replaced with an $N_2$ atmosphere, and was cooled to room temperature. In the above manner, powder of core-shell ε iron oxide nanoparticles each having an α-$Fe_2O_3$ layer (an oxide layer)

and an α-Fe layer (a soft magnetic layer) on the surface, and having an average particle size of 20 nm was obtained.

(Process of Preparing the Coating Material for Forming the Magnetic Layer)

The coating material for forming the magnetic layer was prepared as follows. First, a first composition shown below was kneaded with an extruder. The kneaded first composition and a second composition shown below were then added to a stirring tank equipped with a disperser, and were premixed. Further, sand mill mixing was performed, followed by filtering. Thus, the coating material for forming the magnetic layer was prepared.

(First Composition)

Magnetic powder: 100 parts by mass

Polyester polyurethane resin (methyl ethyl ketone/toluene solution, 30% by mass): 10 parts by mass (trade name: SSS-835, manufactured by Tosoh Corporation)

Aluminum oxide powder: five parts by mass (α-$Al_2O_3$, average particle size: 0.2 μm)

Carbon black: two parts by mass (trade name: SEAST TA, manufactured by Tokai Carbon Co., Ltd.)

(Second Composition)

Polyester polyurethane resin (methyl ethyl ketone/toluene solution, 30% by mass): 10 parts by mass (trade name: SSS-835, manufactured by Tosoh Corporation)

n-butyl stearate: two parts by mass

Methyl ethyl ketone: 121.3 parts by mass

Toluene: 121.3 parts by mass

Cyclohexanone: 60.7 parts by mass

Lastly, four parts by mass of polyisocyanate (trade name: Coronate L, manufactured by Tosoh Corporation) and two parts by mass of myristic acid were added as hardening agents to the coating material for forming the magnetic layer prepared as described above.

(Process of Preparing the Coating Material for Forming the Nonmagnetic Layer)

The coating material for forming the nonmagnetic layer was prepared as follows. First, a third composition shown below was kneaded with an extruder. The kneaded third composition and a fourth composition shown below were then added to a stirring tank equipped with a disperser, and were premixed. Further, sand mill mixing was performed, followed by filtering. Thus, the coating material for forming the nonmagnetic layer was prepared.

(Third Composition)

Acicular iron oxide powder: 100 parts by mass (α-$Fe_2O_3$, average long axis length: 0.15 μm) Polyester polyurethane resin (methyl ethyl ketone/toluene solution, 30% by mass): 10 parts by mass (trade name: SSS-835, manufactured by Tosoh Corporation)

Carbon black: 10 parts by mass (average particle size: 20 nm)

(Fourth Composition)

Polyester polyurethane resin (methyl ethyl ketone/toluene solution, 30% by mass): 10 parts by mass (trade name: SSS-835, manufactured by Tosoh Corporation)

n-butyl stearate: two parts by mass

Methyl ethyl ketone: 108.2 parts by mass

Toluene: 108.2 parts by mass

Cyclohexanone: 18.5 parts by mass

Lastly, four parts by mass of polyisocyanate (trade name: Coronate L, manufactured by Tosoh Corporation) and two parts by mass of myristic acid were added as hardening agents to the coating material for forming the nonmagnetic layer prepared as described above.

(Process of Preparing the Coating Material for Forming the Back Coat Layer)

The coating material for forming the back coat layer was prepared as follows. The materials shown below were mixed in a stirring tank equipped with a disperser, followed by filtering. Thus, the coating material for forming the back coat layer was prepared.

Carbon black (product name: #80, manufactured by Asahi Carbon Co., Ltd.): 100 parts by mass Polyester polyurethane: 100 parts by mass (trade name: N-2304, manufactured by Tosoh Corporation)

Methyl ethyl ketone: 500 parts by mass

Toluene: 400 parts by mass

Cyclohexanone: 100 parts by mass (Film Formation Process)

With the coating materials prepared as described above, a nonmagnetic layer having an average thickness of 0.5 μm and a magnetic layer having an average thickness of 70 nm were formed as described below on a polyethylene naphthalate film (PEN film) that was a nonmagnetic support and had a thickness of 3.9 μm. First, the coating material for forming the nonmagnetic layer was applied onto the PEN film and was dried, to form the nonmagnetic layer on the PEN film. The coating material for forming the magnetic layer was then applied onto the nonmagnetic layer and was dried, to form the magnetic layer on the nonmagnetic layer. Note that, when the coating material for forming the magnetic layer was dried, the magnetic powder was magnetically oriented in the thickness direction of the PEN film by a solenoid coil.

(Calendering)

After that, calendering was performed on the PEN film having the nonmagnetic layer and the magnetic layer formed thereon, and smoothing was performed on the surface of the magnetic layer. At this stage, the surface temperature of the heating roll was 115° C., and the pressure applied to the surface of the magnetic layer 13 by the heating roll was 100 N/mm. After that, the coating material for forming the back coat layer was applied as a 0.6-μm thick film onto the opposite surface from the magnetic layer, and was dried, to form the back coat layer.

(Cutting Process)

The PEN film on which the nonmagnetic layer, the magnetic layer, and the back coat layer were formed as described above was cut to a width of ½ inch (12.65 mm). As a result, the intended magnetic tape was obtained.

Example 2

A magnetic tape was obtained in a manner similar to that in Example 1, except that the thickness of the chromium plating layer was 2 μm.

Comparative Example 1

A magnetic tape was obtained in a manner similar to that in Example 1, except that calendering was performed with a heating roll obtained by the heating roll preparation process described below.

(Heating Roll Preparation Process)

A heating roll was prepared through the same heating roll preparation process as that in Example 1, except that only a chromium plating was formed, without formation of a nickel-phosphorus alloy layer. Note that the thickness of the chromium plating layer was 50 μm.

[Evaluations]

(Linear Protrusions)

First, 10 μm×10 μm AFM images were acquired at five locations randomly selected from the surface of the magnetic layer. An evaluation was then made by checking whether or not a linear protrusion that was 3 nm to 20 nm in height, was 0.3 μm to 1.0 μm in width, and extended across two sides of an AFM image existed among the acquired AFM image of the five locations. Note that the height and the width of each linear protrusion were measured by the measurement method described in the above embodiment.

(Error Rate)

First, the error rate of each magnetic tape in a 25° C. environment was measured with a ½-inch tape running device (MTS Transport, manufactured by Mountain Engineering II, Inc.) equipped with a recording/reproducing head and a recording/reproducing amplifier. Note that commercially available linier tape open (LTO)-6 was used as the recording/reproducing head. Next, the measured error rates were evaluated according to the following criteria.

◉: The error rate is equal to or lower than ½ of the error rate of the reference tape.

○: The error rate is equal to or lower than the error rate of the reference tape, but is higher than ½ of the error rate of the reference tape.

×: The error rate is higher than the error rate of the reference tape.

Table 1 shows the results of evaluations of the magnetic tapes of Examples 1 and 2 and Comparative Example 1.

TABLE 1

|  | Linear protrusions | Error Rate |
| --- | --- | --- |
| Example 1 | No linear protrusions existed in any of AFM images at five locations | ◉ |
| Example 2 | Linear protrusions existed in an AFM image at one location among AFM images at five locations | ○ |
| Comparative Example 1 | Linear protrusions existed in AFM images at two or more locations among AFM images at five locations | X |

From the above evaluation results, it became apparent that the error rate can be lowered in a case where any linear protrusion extending across two sides of an AFM image does not exist in the AFM images of four locations among the AFM images of the five locations on the surface of the magnetic layer.

Although embodiments and examples of the present disclosure have been specifically described so far, the present disclosure is not limited to the above embodiments and examples, and various changes based on the technical idea of the present disclosure may be made to them.

For example, the configurations, the methods, the processes, the shapes, the materials, the numerical values, and the like mentioned in the above described embodiments and examples are merely examples, and configurations, methods, processes, shapes, materials, numerical values, and the like that differ from those mentioned above may be used as necessary. Further, chemical formulas of compounds and the like are typical examples, and are not limited to the valences and the like described above, as long as the names are general names of the same compounds.

Furthermore, the configurations, methods, processes, shapes, materials, numerical values, and the like mentioned in the above embodiments and examples can be combined as appropriate, without departing from the scope of the present disclosure.

Furthermore, the present disclosure can also adopt the configurations described below.

(1)

A magnetic recording medium including:

a substrate that is long in shape; and a magnetic layer containing magnetic powder and a binder, in which a glass transition point of the binder is not lower than 75° C., and in a case where atomic force microscope observation images in a 10 μm×10 μm square shape are acquired at five locations randomly selected from a surface on a side of the magnetic layer, any linear protrusion that is 3 nm to 20 nm in height, is 0.3 μm to 1.0 μm in width, and extends across two sides of the observation image does not exist in the observation images of four locations among the acquired observation images of the five locations.

(2)

The magnetic recording medium according to (1), in which an arithmetic average roughness Ra of the surface is not higher than 1.5 nm.

(3)

The magnetic recording medium according to (1) or (2), in which an average thickness is not greater than 5.0 μm.

(4)

The magnetic recording medium according to any one of (1) to (3), in which an average thickness is not greater than 4.5 μm.

(5)

The magnetic recording medium according to any one of (1) to (4), further including a nonmagnetic layer disposed between the substrate and the magnetic layer.

(6)

The magnetic recording medium according to (5), in which a sum of an average thickness of the magnetic layer and an average thickness of the nonmagnetic layer is not greater than 0.7 μm.

(7)

The magnetic recording medium according to (5) or (6), in which a sum of an average thickness of the magnetic layer and an average thickness of the nonmagnetic layer is not greater than 0.5 μm.

(8)

The magnetic recording medium according to any one of (5) to (7), in which the nonmagnetic layer contains acicular nonmagnetic particles, and an average long axis length of the nonmagnetic particles is not smaller than 70 nm.

(9)

The magnetic recording medium according to any one of (5) to (8), in which the nonmagnetic layer contains carbon, and an area ratio of the carbon in the nonmagnetic layer is not lower than 80%.

(10)

The magnetic recording medium according to any one of (1) to (9), in which the magnetic powder contains particles containing ε iron oxide or barium ferrite.

(11)

The magnetic recording medium according to any one of (1) to (10), in which a linear recording density is not lower than 520 kbpi.

(12)

The magnetic recording medium according to any one of (1) to (11), in which a track pitch is not wider than 2.0 µm.

(13)

The magnetic recording medium according to any one of (1) to (12), in which the magnetic recording medium is reproduced by a reproducing head having a width not greater than 1.0 µm.

(14)

The magnetic recording medium according to any one of (1) to (13), in which the magnetic recording medium is reproduced by a tunnel magnetoresistive head.

REFERENCE SIGNS LIST

11 Substrate
12 Nonmagnetic layer
13 Magnetic layer
14 Back coat layer
15 Reinforcing layer
16 Anti-cupping layer
17 First reinforcing layer
18 Second reinforcing layer
19 Anti-adhesion layer

The invention claimed is:

1. A magnetic recording medium comprising:
a substrate that is long in shape; and
a magnetic layer including a magnetic powder and a binder, wherein
a glass transition point of the binder is not lower than 75° C., and
in a case where atomic force microscope observation images in a 10 µm×10 µm square shape are acquired at five locations randomly selected from a surface on a side of the magnetic layer, any linear protrusion that is 3 nm to 20 nm in height, is 0.3 µm to 1.0 µm in width, and extends across two sides of an observation image does not exist in the observation images of four locations among the observation images of the five locations that are acquired.

2. The magnetic recording medium according to claim 1, wherein an arithmetic average roughness Ra of the surface is not higher than 1.5 nm.

3. The magnetic recording medium according to claim 1, wherein an average thickness of the magnetic recording medium is not greater than 5.0 µm.

4. The magnetic recording medium according to claim 1, wherein an average thickness of the magnetic recording medium is not greater than 4.5 µm.

5. The magnetic recording medium according to claim 1, further comprising
a nonmagnetic layer disposed between the substrate and the magnetic layer.

6. The magnetic recording medium according to claim 5, wherein a sum of an average thickness of the magnetic layer and an average thickness of the nonmagnetic layer is not greater than 0.7 µm.

7. The magnetic recording medium according to claim 5, wherein a sum of an average thickness of the magnetic layer and an average thickness of the nonmagnetic layer is not greater than 0.5 µm.

8. The magnetic recording medium according to claim 5, wherein
the nonmagnetic layer includes acicular nonmagnetic particles, and
an average long axis length of the nonmagnetic particles is not smaller than 70 nm.

9. The magnetic recording medium according to claim 5, wherein
the nonmagnetic layer includes carbon, and
an area ratio of the carbon in the nonmagnetic layer is not lower than 80%.

10. The magnetic recording medium according to claim 1, wherein the magnetic powder includes particles including ε iron oxide or barium ferrite.

11. The magnetic recording medium according to claim 1, wherein a linear recording density is not lower than 520 kbpi.

12. The magnetic recording medium according to claim 1, wherein a track pitch is not wider than 2.0 µm.

13. The magnetic recording medium according to claim 1, wherein the magnetic recording medium is reproduced by a reproducing head having a width not greater than 1.0 µm.

14. The magnetic recording medium according to claim 1, wherein the magnetic recording medium is reproduced by a tunnel magnetoresistive head.

15. The magnetic recording medium according to claim 1, wherein any linear protrusion does not exist in the observation images of the five locations that are acquired.

* * * * *